US011070997B2

(12) United States Patent
Yao et al.

(10) Patent No.: US 11,070,997 B2
(45) Date of Patent: Jul. 20, 2021

(54) PERFORMANCE MEASUREMENT JOB CONTROL FOR 5G NETWORKS AND NETWORK SLICING

(71) Applicant: Intel Corporation, Santa Clara, CA (US)

(72) Inventors: Yizhi Yao, Chandler, AZ (US); Joey Chou, Scottsdale, AZ (US)

(73) Assignee: Intel Corporation, Santa Clara, CA (US)

(*) Notice: Subject to any disclaimer, the term of this patent is extended or adjusted under 35 U.S.C. 154(b) by 97 days.

(21) Appl. No.: 16/281,160

(22) Filed: Feb. 21, 2019

(65) Prior Publication Data

US 2019/0253907 A1 Aug. 15, 2019

Related U.S. Application Data

(60) Provisional application No. 62/634,000, filed on Feb. 22, 2018.

(51) Int. Cl.
  *G06F 15/173* (2006.01)
  *H04W 24/10* (2009.01)
  (Continued)

(52) U.S. Cl.
  CPC ........ *H04W 24/10* (2013.01); *G06F 9/45558* (2013.01); *G06F 9/4881* (2013.01); *H04W 16/02* (2013.01); *G06F 2009/45595* (2013.01)

(58) Field of Classification Search
  CPC ... H04W 24/10; H04W 16/02; G06F 9/45558; G06F 9/4881; G06F 2009/45595
  See application file for complete search history.

(56) References Cited

U.S. PATENT DOCUMENTS

2018/0270073 A1* 9/2018 Senarath ............... H04M 15/46
2020/0059407 A1* 2/2020 Lu ........................... H04L 41/28
(Continued)

FOREIGN PATENT DOCUMENTS

CN      110062407 A  *  7/2019

OTHER PUBLICATIONS

Shitao Li, "ETSI GS NFV-IFA 008 V2.1.1", Oct. 2016, ETSI, V2.1.1, pp. 1-83 (Year: 2016).*
(Continued)

*Primary Examiner* — Jonathan A Bui
(74) *Attorney, Agent, or Firm* — Schwegman Lundberg & Woessner, P.A.

(57) ABSTRACT

Systems and methods of performance management over a life cycle is provided. A measurement job control service producer receives, from an authorized consumer, a request to consume a measurement job control service. The request is analyzed, appropriate action is taken to satisfy the request and a response indicating the request result is generated. A request is to create or terminate a measurement job to collect the performance data for a NF, NSSI, NSI, or network. To create a job, the producer checks if the job can be supported by an existing job, creates the job if no such existing job exists, and otherwise responds that the job can be supported by the existing job. To terminate a job, the producer checks if the job is serving other consumers, terminates the job if other consumers are not being served, and otherwise responds that the job is currently serving other consumers.

10 Claims, 4 Drawing Sheets

(51) Int. Cl.
*H04W 16/02* (2009.01)
*G06F 9/48* (2006.01)
*G06F 9/455* (2018.01)

(56) References Cited

U.S. PATENT DOCUMENTS

| | | | |
|---|---|---|---|
| 2020/0162345 A1* | 5/2020 | Vaishnavi | H04L 41/50 |
| 2020/0213937 A1* | 7/2020 | Yang | H04L 41/0806 |
| 2020/0228405 A1* | 7/2020 | Fang | H04L 41/0806 |
| 2020/0235989 A1* | 7/2020 | Sun | H04B 7/0697 |

OTHER PUBLICATIONS

"3GPP TS 32.412 V14.0.0", Dec. 2016, 3GPP, V14.0.0, pp. 1-68 (Year: 2016).*
"3GPP TS 28.520 V14.0.0", Jun. 2017, 3GPP, V14.0.0, pp. 1-17 (Year: 2017).*
"U.S. Appl. No. 16/408,120, Non Final Office Action dated Sep. 18, 2020", 12 pgs.
"U.S. Appl. No. 16/408,120, Response filed Nov. 30, 2020 to Non Final Office Action dated Sep. 18, 2020", 12 pgs.
"U.S. Appl. No. 16/408,120, Examiner Interview Summary dated Dec. 1, 2020", 2 pgs.
"3GPPTS 32.412 V14,0.0", 3GPP, V14.0.0, (Dec. 2016), 1-68.
"U.S. Appl. No. 16/408,120, Notice of Allowance dated Feb. 9, 2021", 13 pgs.

* cited by examiner

PERFORMANCE MEASUREMENT JOB CONTROL FOR 5G NETWORKS AND NETWORK SLICING

PRIORITY CLAIM

This application claims the benefit of priority under 35 U.S.C. 119(e) to U.S. Provisional Patent Application Ser. No. 62/634,000, filed Feb. 22, 2018, which is incorporated herein by reference in its entirety.

TECHNICAL FIELD

Embodiments pertain to radio access networks (RANs). Some embodiments relate to cellular and wireless local area network (WLAN) networks, including Third Generation Partnership Project Long Term Evolution (3GPP LTE) networks and LTE advanced (LTE-A) networks as well as legacy networks, $4^{th}$ generation (4G) networks and $5^{th}$ generation (5G) networks. Some embodiments relate to management of performance measurement jobs.

BACKGROUND

The use of 3GPP LTE systems (including LTE and LTE-Advanced systems) has increased due to both an increase in the types of devices user equipment (UEs) using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated, especially with the advent of next generation (NG) systems.

To add further complexity to the variety of services provided by the network devices, many physical implementations of the network devices are propriety and may be unable to incorporate new or adjusted physical components to compensate for different network conditions. This has led to the development of Network Function Virtualization (NFV), which may provide a virtualized environment able to provide any network function or service able to be delivered on general purpose computing systems in a data center as software applications called Virtual Network Functions (VNFs). The use of NFV may provide flexibility in configuring network elements, enabling dynamic network optimization and quicker adaptation of new technologies. As 5G systems develop, flexibility in determining performance management of such systems, including lifecycle of performance measurement jobs also is to be developed.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
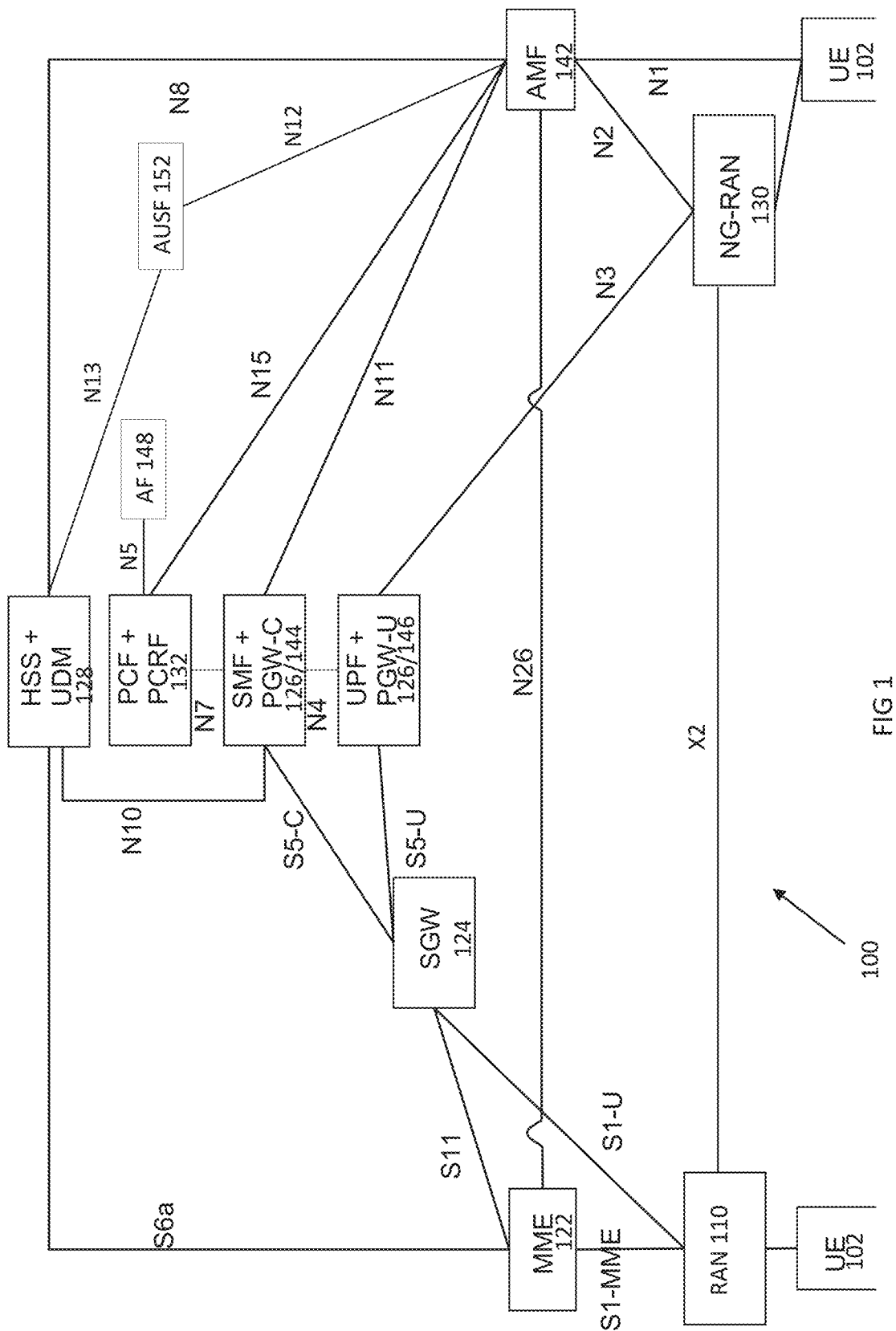
FIG. 1 illustrates combined communication system in accordance with some embodiments.

FIG. 1 illustrates a combined communication system in accordance with some embodiments. The system 100 includes 3GPP LTE/4G and NG network functions. A network function can be implemented as a discrete network element on a dedicated hardware, as a software instance running on dedicated hardware, or as a virtualized function instantiated on an appropriate platform, e.g., dedicated hardware or a cloud infrastructure.

The evolved packet core (EPC) of the LTE/4G network contains protocol and reference points defined for each entity. These core network (CN) entities may include a mobility management entity (MME) 122, serving gateway (S-GW) 124, and paging gateway (P-GW) 126.

In the NG network, the control plane and the user plane may be separated, which may permit independent scaling and distribution of the resources of each plane. The UE 102 may be connected to either an access network or random access network (RAN) 110 and/or may be connected to the NG-RAN 130 (gNB) or an Access and Mobility Function (AMF) 142. The RAN may be an eNB, a gNB or a general non-3GPP access point, such as that for Wi-Fi. The NG core network may contain multiple network functions besides the AMF 112. The network functions may include a User Plane Function (UPF) 146, a Session Management Function (SMF) 144, a Policy Control Function (PCF) 132, an Application Function (AF) 148, an Authentication Server Function (AUSF) 152 and User Data Management (UDM) 128. The various elements are connected by the NG reference points shown in FIG. 1.

The AMF 142 may provide UE-based authentication, authorization, mobility management, etc. The AMF 142 may be independent of the access technologies. The SMF 144 may be responsible for session management and allocation of IP addresses to the UE 102. The SMF 144 may also select and control the UPF 146 for data transfer. The SMF 144 may be associated with a single session of the UE 102 or multiple sessions of the UE 102. This is to say that the UE 102 may have multiple 5G sessions. Different SMFs may be allocated to each session. The use of different SMFs may permit each session to be individually managed. As a consequence, the functionalities of each session may be independent of each other. The UPF 126 may be connected with a data network, with which the UE 102 may communicate, the UE 102 transmitting uplink data to or receiving downlink data from the data network.

The AF 148 may provide information on the packet flow to the PCF 132 responsible for policy control to support a desired QoS. The PCF 132 may set mobility and session management policies for the UE 102. To this end, the PCF 132 may use the packet flow information to determine the appropriate policies for proper operation of the AMF 142 and SMF 144. The AUSF 152 may store data for UE authentication. The UDM 128 may similarly store the UE subscription data.

The gNB 130 may be a standalone gNB or a non-standalone gNB, e.g., operating in Dual Connectivity (DC) mode as a booster controlled by the eNB 110 through an X2 or Xn interface. At least some of functionality of the EPC and the NG CN may be shared (alternatively, separate components may be used for each of the combined component shown). The eNB 110 may be connected with an MME 122 of the EPC through an S1 interface and with a SGW 124 of the EPC 120 through an S1-U interface. The MME 122 may be connected with an HSS 128 through an S6a interface while the UDM is connected to the AMF 142 through the N8 interface. The SGW 124 may connected with the PGW 126 through an S5 interface (control plane PGW-C through S5-C and user plane PGW-U through S5-U). The PGW 126 may serve as an IP anchor for data through the internet.

The NG CN, as above, may contain an AMF 142, SMF 144 and UPF 146, among others. The eNB 110 and gNB 130 may communicate data with the SGW 124 of the EPC 120 and the UPF 146 of the NG CN. The MME 122 and the AMF 142 may be connected via the N26 interface to provide control information there between, if the N26 interface is supported by the EPC 120. In some embodiments, when the gNB 130 is a standalone gNB, the 5G CN and the EPC 120 may be connected via the N26 interface.

Figure 2:
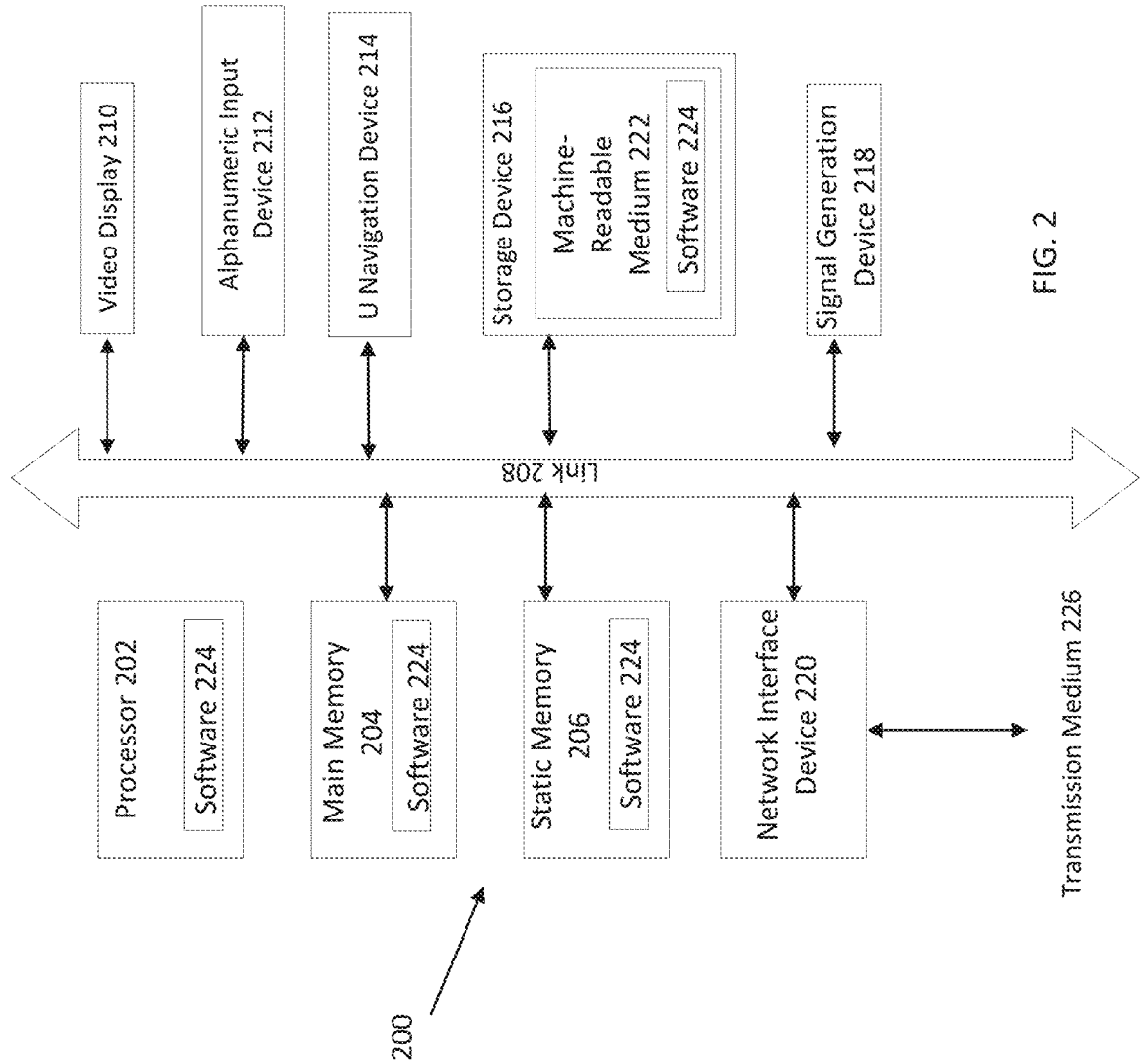
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, or any machine capable of executing instructions (sequential or otherwise) that specify actions to be taken by that machine. For example, the communication device 200 may be implemented as one or more of the devices shown in FIG. 1.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/$5^{th}$ generation (5G) standards among others. In an example, the network interface device 220 may include one or more physical jacks (e.g., Ethernet, coaxial, or phone jacks) or one or more antennas to connect to the transmission medium 226.

Figure 3:
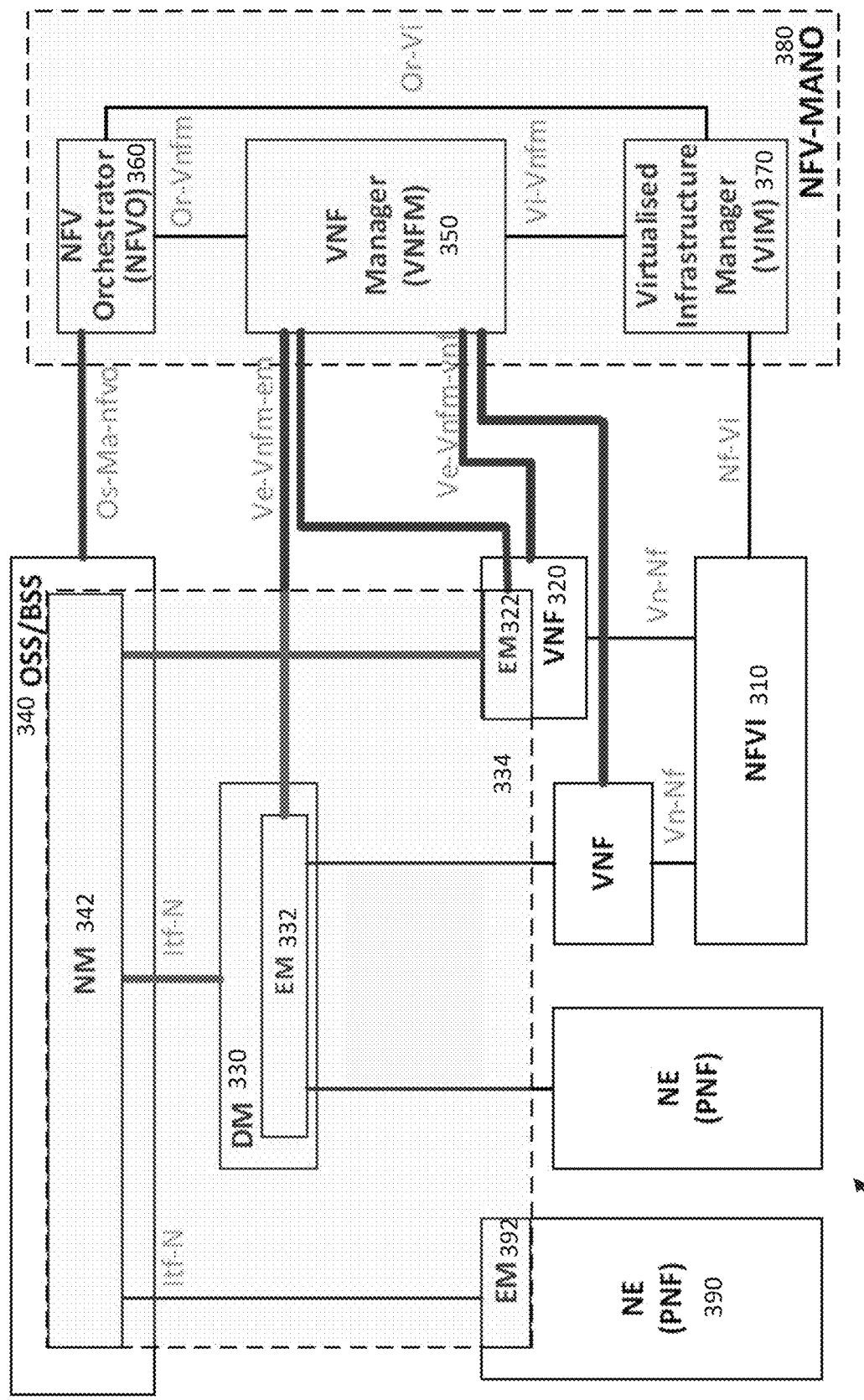
FIG. 3 illustrates an NFV network management architecture in accordance with some embodiments.

FIG. 3 illustrates an NFV network management architecture in accordance with some embodiments. As illustrated, the NFV network management architecture 300 may include a number of elements (each of which may contain physical and/or virtualized components), including a Network Function Virtualization Infrastructure (NFVI) 310, Network elements (NEs) 390, Virtual Network Functions (VNFs) 320, a Domain Manager (DM) 330, an Element Manager (EM) 332, a Network Manager (NM) 342, and an NFV Management and Orchestration (NFV-MANO) 380. The NFV-MANO 380, which may be replaced as indicated herein by multiple NFV-MANOs, may comprise a Virtualized Infrastructure Manager (VIM) 370, a VNF Manager (VNFM) 350, and a Network Function Virtualization Orchestrator (NFVO) 360. The NM 342 may be contained in an Operations Support System/Business Support System (OSS/BSS) 320, with the DM 330 and NM 342 forming the 3GPP management system 334.

The NFV network management architecture 300 may be implemented by, for example, a data center comprising one or more servers in the cloud. The NFV network management architecture 300, in some embodiments, may include one or more physical devices and/or one or more applications hosted on a distributed computing platform, a cloud computing platform, a centralized hardware system, a server, a computing device, and/or an external network-to-network interface device, among others. In some cases, the virtualized resource performance measurement may include, for example, latency, jitter, bandwidth, packet loss, nodal connectivity, compute, network, and/or storage resources, accounting, fault and/or security measurements. In particular, the NEs 390 may comprise physical network functions (PNF) including both hardware such as processors, antennas, amplifiers, transmit and receive chains, as well as software. The VNFs 320 may be instantiated in one or more servers. Each of the VNFs 320, DM 330 and the NEs 390 may contain an EM 322, 332, 392.

The NFV Management and Orchestration (NFV-MANO) 380 may manage the NFVI 310. The NFV-MANO 380 may orchestrate the instantiation of network services, and the allocation of resources used by the VNFs 320. The NFV-MANO 380 may, along with the OSS/BSS 340, be used by external entities to deliver various NFV business benefits. The OSS/BSS 340 may include the collection of systems and management applications that a service provider may use to operate their business: management of customers, ordering, products and revenues—for example, payment or account transactions, as well as telecommunications network components and supporting processes including network component configuration, network service provisioning and fault handling. The NFV-MANO 380 may create or terminate a VNF 320, increase or decrease the VNF capacity, or update or upgrade software and/or configuration of a VNF. The NFV-MANO 380 may include a Virtualized Infrastructure Manager (VIM) 370, a VNF Manager (VNFM) 350 and a NFV Orchestrator (NFVO) 360. The NFV-MANO 380 may have access to various data repositories including network services, VNFs available, NFV instances and NFVI resources with which to determine resource allocation.

The VIM 370 may control and manage the NFVI resources via Nf-Vi reference points within the infrastructure sub-domain. The VIM 370 may further collect and forward performance measurements and events to the VNFM 350 via Vi-VNFM and to the NFVO 360 via Or-Vi reference points. The NFVO 360 may be responsible for managing new VNFs and other network services, including lifecycle management of different network services, which may include VNF instances, global resource management, validation and authorization of NFVI resource requests and policy management for various network services. The NFVO 360 may coordinate VNFs 320 as part of network services that jointly realize a more complex function, including joint instantiation and configuration, configuring required connections between different VNFs 320, and managing dynamic changes of the configuration. The NFVO 360 may provide this orchestration through an OS-Ma-NFVO reference point with the NM 342. The VNFM 350 may orchestrate NFVI resources via the VIM 370 and provide overall coordination and adaptation for configuration and event reporting between the VNFM 350 and the EMs and NM. The former may involve discovering available services, managing virtualized resource availability/allocation/release and providing virtualized resource fault/performance management. The latter may involve lifecycle management that may include instantiating a VNF, scaling and updating the VNF instances, and terminating the network service, releasing the NFVI resources for the service to the NFVI resource pool to be used by other services.

The VNFM 350 may be responsible for the lifecycle management of the VNFs 320 via the Ve-VNFM-VNF reference point and may interface to EMs 322, 332 through the Ve-VNFM-EM reference point. The VNFM 350 may be assigned the management of a single VNF 320, or the management of multiple VNFs 320 of the same type or of different types. Thus, although only one VNFM 350 is shown in FIG. 3, different VNFMs 350 may be associated with the different VNFs 320 for performance measurement and other responsibilities. The VNFM 350 may provide a number of VNF functionalities, including instantiation (and configuration if required by the VNF deployment template), software update/upgrade, modification, scaling out/in and up/down, collection of NFVI performance measurement results and faults/events information and correlation to VNF instance-related events/faults, healing, termination, lifecycle management change notification, integrity management, and event reporting.

The VIM 370 may be responsible for controlling and managing the NFVI compute, storage and network resources, usually within one operator's Infrastructure Domain. The VIM 370 may be specialized in handling a certain type of NFVI resource (e.g. compute-only, storage-only, networking-only), or may be capable of managing multiple types of NFVI resources. The VIM 370 may, among others, orchestrate the allocation/upgrade/release/reclamation of NFVI resources (including the optimization of such resources usage) and manage the association of the virtualized resources to the physical compute, storage, networking resources, and manage repository inventory-related information of NFVI hardware resources (compute, storage, networking) and software resources (e.g. hypervisors), and discovery of the capabilities and features (e.g. related to usage optimization) of such resources.

The NFVI 310 may itself contain various virtualized and non-virtualized resources. These may include a plurality of virtual machines (VMs) that may provide computational abilities (CPU), one or more memories that may provide storage at either block or file-system level and one or more networking elements that may include networks, subnets, ports, addresses, links and forwarding rules to ensure intra- and inter-VNF connectivity.

Each VNF 320 may provide a network function that is decoupled from infrastructure resources (computational resources, networking resources, memory) used to provide the network function. Although not shown, the VNFs 320 can be chained with other VNFs 320 and/or other physical network function to realize a network service. The virtualized resources may provide the VNFs 320 with desired resources. Resource allocation in the NFVI 310 may simultaneously meet numerous requirements and constraints, such as low latency or high bandwidth links to other communication endpoints.

The VNFs 320, like the NEs 390 may be managed by one or more EMs 322, 332, 392. The EM may provide functions for management of virtual or physical network elements, depending on the instantiation. The EM may manage individual network elements and network elements of a subnetwork, which may include relations between the network elements. For example, the EM 322 of a VNF 320 may be responsible for configuration for the network functions provided by a VNF 320, fault management for the network functions provided by the VNF 320, accounting for the usage of VNF functions, and collecting performance measurement results for the functions provided by the VNF 320.

The EMs 322, 332, 392 (whether in a VNF 320 or NE 390) may be managed by the NM 342 of the OSSiBSS 340 through Itf-N reference points. The NM 342 may provide functions with the responsibility for the management of a network, mainly as supported by the EM 332 but may also involve direct access to the network elements. The NM 342 may connect and disconnect VNF external interfaces to physical network function interfaces at the request of the NFVO 360.

As above, the various components of the system may be connected through different reference points. The references points between the NFV-MANO 380 and the functional blocks of the system may include an Os-Ma-NFVO between the NM 342 and NFVO 360, a Ve-VNFM-EM between the EM 322, 332 and the VNFM 350, a Ve-VNFM-VNF between a VNF 320 and the VNFM 350, a Nf-Vi between the NFVI 310 and the VIM 370, an Or-VNFM between the NFVO 360 and the VNFM 350, an Or-Vi between the NFVO 360 and the VIM 370, and a Vi-VNFM between the VIM 370 and the VNFM 350. An Or-Vi interface may implement the VNF software image management interface and interfaces for the management of virtualized resources, their catalogue, performance and failure on the Or-Vi reference point. An Or-Vnfm interface may implement a virtualized resource management interface on the Or-Vnfm reference point. A Ve-Vnfm interface may implement a virtualized resource performance/fault management on the Ve-Vnfm reference point.

As above, with the advent of 5G networks and disparate devices (such as Machine Type Communication (MTC), enhanced Mobile Broadband (eMBB) and Ultra-Reliable and Low Latency Communications (URLLC) devices) using these networks, network management and network slicing is evolving towards a service based architecture in which virtualization is used. To provide network management and slicing, a number of work items may be developed, including network provisioning and resource management, fault supervision, and performance management (PM) and reporting.

Network slicing is a form of virtualization that allows multiple virtual networks to run on top of a common shared physical network infrastructure. Network slicing serves service requirements by providing isolation between network resources, as well as permitting an optimized topology and specific configuration to be developed for each Network Slice Instance (NSI). The different parts of an NSI may be grouped as Network Slice Subnets that allow the lifecycle of a Network Slice Subnet Instance (NSSI) to be managed independently from the lifecycle of an NSI. The NSSIs may be implemented as different core networks, such RAN and 5GC.

Lifecycle management of an NSSI may include creation, activation, modification, de-activation and termination of the NSSI. Similar management occurs for NSIs. During creation, for example, resources are allocated and configured to satisfy the NSI or NSSI requirements. During operation, performance measurements generation, collection and reporting may be undertaken.

However, while legacy PM Integration Reference Points (IRPs) such as Basic core management (CM) IRP, Bulk CM IRP, Kernel CM IRP, are able to operate for the existing network management architecture, the existing network management architecture is not a service-based architecture. The network management architecture therefore may be unable to be used to provide PM for 5G networks and network slicing.

Figure 4:
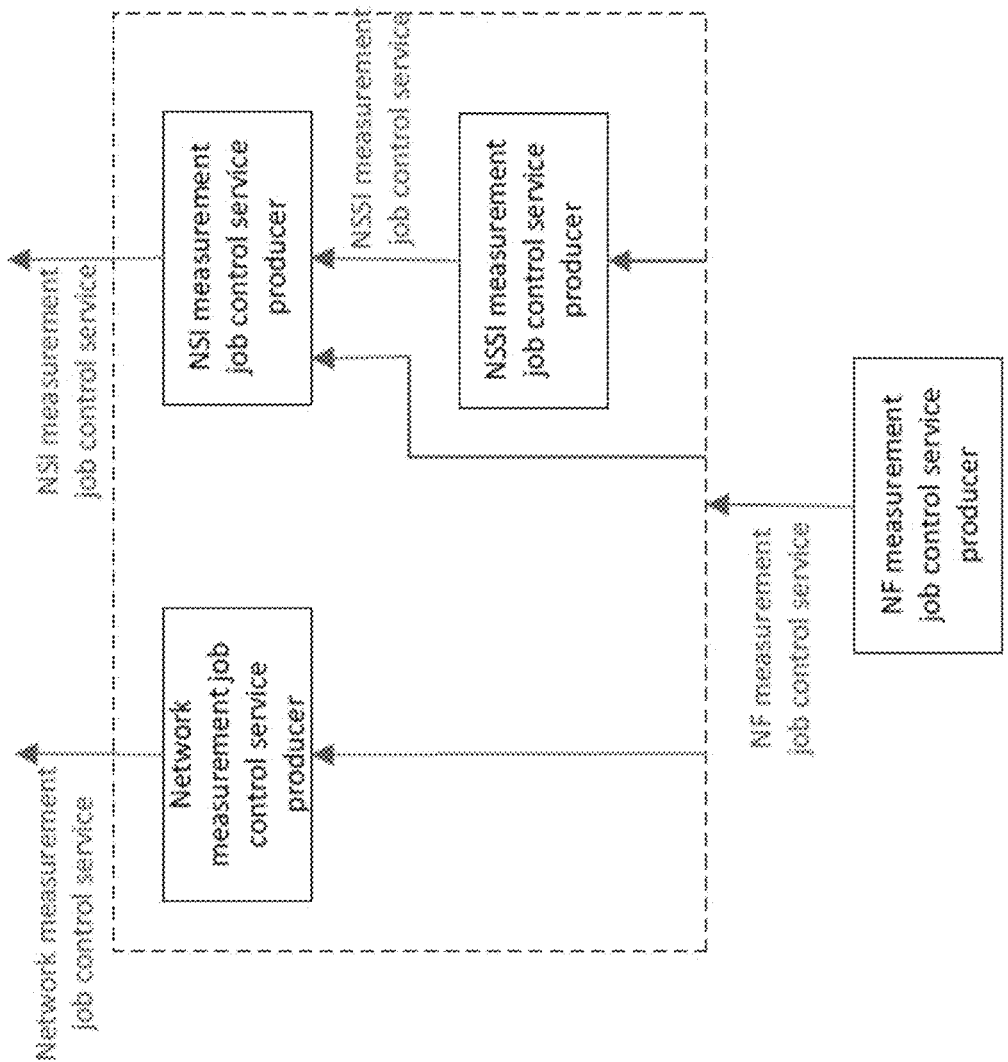
FIG. 4 illustrates measurement job control services in accordance with some embodiments.

FIG. 4 illustrates measurement job control services in accordance with some embodiments. The services provided by each measurement job control service are shown, which may be performed by one or more of the devices shown in FIGS. 1-3. The producer may be for example, in an EM (managing the network functions), or within the controlled NF or a separate element connected with the controlled NF. As illustrated, the network measurement job control service producer consumes an NF measurement job control service to produce the network measurement job control service, the NSSI measurement job control service producer consumes an NF measurement job control service or another NSSI measurement job control service to produce the NSSI measurement job control service, and the NSI measurement job control service producer consumes an NF measurement job control service, and/or NSSI measurement job control service to produce the NSI measurement job control service. The original NSSI measurement job control service producer may send requests for performance measurement jobs to the other NSSI measurement job control service producer(s) and/or NF measurement job control service producer(s), receive the responses about the measurement job creation(s). The original NSSI measurement job control service producer may collect the performance measurements from another NSSI measurement job control service producer(s) and/or NF measurement job control service producer(s), and aggregate the performance measurements (perhaps doing additional processing) to the performance measurements of the original NSSI, and then report performance measurements of the original NSSI to the customer. The NSSI measurement job control service producer may thus do more than merely aggregation of the performance measurements.

The performance measurement jobs produced by the various producers may indicate which performance measurements are to be collected, the period of collection and where the performance measurements are to be delivered, among others. The measurements requested may include network measurements such as packet transmission/reception or handover performance (e.g., number of requests and failures/successes) between neighbor cells. The results of the performance measurements may be used, for example to determine KPIs or for network optimization.

The following use cases describe the functions of performance measurement job creation for Network Function (NF), NSI, NSSI and network. The performance measurement job creation of the different use cases add that upon receiving the request, the service producer first checks whether the performance measurement jobs to be created for monitoring the NF/NSSI/NS/network performance already exist and if the performance measurement job exists, the service producer sends a response indicating that the requested performance measurement job can be supported by the existing job; otherwise, a new performance measurement job is created. Similar changes may be added in the post condition to indicate that the requested performance measurement job is supported by the existing job or new job. The performance measurement job control service producer may further request another measurement job control service producer to create measurement job(s) for the constituent NSSI(s)/NF(s). The measurement job control service producer may collect the performance data from the performance data reporting service producer (e.g., performance data file reporting service producer, or performance data streaming service producer) for the NF(s) or constituent NSSI(s)/NF(s), aggregate or calculate (or process) the performance data per the measurement job creation request, and send the performance data report(s) to the consumer.

The network discussed herein may be a complete network or a sub-network.

Thus, the use cases in TS 28.550 may be provided as:

5.11.1.1 Creation of Measurement Job for 3GPP NF(s)

| Use case stage | Evolution/Specification | <<Uses>> Related use |
|---|---|---|
| Goal | To enable the authorized consumer to create a measurement job for collecting the performance data of 3GPP NF(s). | |
| Actors and Roles | An authorized consumer of NF measurement job control service. | |
| Telecom resources | 3GPP NF(s); Producer of the NF measurement job control service. | |
| Assumptions | N/A | |
| Pre-conditions | The 3GPP NF(s) have been deployed. The NF measurement job control service producer is in operation. | |
| Begins when | The authorized consumer needs to create measurement job for collecting the performance data of 3GPP NF(s). | |
| Step 1 (M) | The authorized consumer requests the NF measurement job control service producer to create measurement job to collect the performance data of 3GPP NF(s). The request needs to indicate that the performance data needs to be reported by performance data file or by performance data streaming. | |
| Step 2 (M) | The NF measurement job control service producer checks if the requested NF measurement job can be supported by the existing NF measurement job(s). If the result is true, the NF measurement job control service producer responds to the request and indicates that requested NF measurement job is supported by the existing NF measurement job(s); Else, the NF measurement job control service producer requests the 3GPP NF(s) to create the measurement job to collect the performance data, per the received measurement job creation request. | |
| Ends when | All the steps identified above are successfully completed. | |
| Exceptions | One of the steps identified above fails. | |
| Post-conditions | The measurement job for 3GPP NF(s) has been created and the 3GPP NF(s) generate the performance data for the NF measurement job; or The requested NF measurement job is not created but supported by the existing NF measurement job(s), according to step 2. | |
| Traceability | REQ-MJCS_NF-FUN-1, REQ-MJCS_NF-FUN-2, and REQ-MJCS_NF-FUN-3 | |

5.1.2.1.2 Creation of measurement job for NSSI(s)

| Use case stage | Evolution/Specification | <<Uses>> Related use |
|---|---|---|
| Goal | To enable the authorized consumer to create a measurement job for collecting the performance data of NSSI(s). | |
| Actors and Roles | An authorized consumer of NSSI measurement job control service. | |
| Telecom resources | NSSI(s); NSSI measurement job control service producer; NF measurement job control service producer; NF performance data file reporting service producer and/or NF performance data streaming service producer; NSSI performance data file reporting service producer and/or NSSI performance data streaming service producer. | |
| Assumptions | N/A | |
| Pre-conditions | The NSSI(s) have been deployed. The NSSI measurement job control service producer is in operation. | |
| Begins when | The authorized consumer needs to create measurement job for collecting the performance data of NSSI(s). | |
| Step 1 (M) | The authorized consumer requests the NSSI measurement job control service producer to create an NSSI measurement job to collect the performance data of NSSI(s). The request needs to indicate that the performance data needs to be reported by performance data file or by performance data streaming. | |
| Step 2 (M) | The NSSI measurement job control service producer checks if the requested NSSI measurement job can be supported by the existing NSSI measurement job(s). If the result is true, the NSSI measurement job control service producer responds to the request and indicates that the requested NSSI measurement job is supported by the existing NSSI measurement job(s); Else, the NSSI measurement job control service producer decomposes the performance data type(s) of NSSI(s) into performance data type(s) of the constituent NSSI(s) and/or 3GPP NF(s); and The NSSI measurement job control service producer requests the corresponding the NSSI measurement job control service producer(s) to create the NSSI measurement job(s) for the constituent NSSI(s) if any, and/or The NSSI measurement job control service producer consumes the NF measurement job control service to create the measurement job(s) for the constituent 3GPP NF(s) (according to the use case "Creation of measurement job for 3GPP NF" as described in clause 5.1.1.1.1). | Creation of measurement job for 3GPP NF |
| Ends when | All the steps identified above are successfully completed. | |
| Exceptions | One of the steps identified above fails. | |
| Post-conditions | The measurement job for NSSI has been created, and the NSSI measurement job control service producer consumes the NSSI performance data file reporting service and/or NSSI performance data streaming service to get the performance data of the constituent NSSI(s), and/or consumes the NF performance data file reporting service and/or NF performance data streaming service to get the performance data of the constituent NF(s), and generates the performance data for the NSSI measurement job; or The requested NSSI measurement job is not created but supported by the existing NSSI measurement job(s), according to step 2. | NSSI performance data file reporting; NSSI performance data streaming; 3GPP NF performance data file reporting; 3GPP NF performance data streaming |
| Traceability | REQ-MJCS_NSSI-FUN-1, REQ-MJCS_NSSI-FUN-2, REQ-MJCS_NSSI-FUN-3, REQ-MJCS_NSSI-FUN-4 | |

5.1.3.1.3 Creation of measurement job for NSI(s)

| Use case stage | Evolution/Specification | <<Uses>> Related use |
|---|---|---|
| Goal | To enable the authorized consumer to create a measurement job for collecting the performance data of NSI(s). | |
| Actors and Roles | An authorized consumer of NSI measurement job control service. | |
| Telecom resources | NSI(s); NSI measurement job control service producer; The set of NSSI measurement job control service producer, NSSI performance data file reporting service producer and/or | |

-continued

| Use case stage | Evolution/Specification | <<Uses>> Related use |
|---|---|---|
| | NSSI performance data streaming service producer; and/or The set of NF measurement job control service producer, NF performance data file reporting service producer and/or NF performance data streaming service producer. | |
| Assumptions | N/A | |
| Pre-conditions | The NSI(s) have been deployed. The NSI measurement job control service producer is in operation. | |
| Begins when | The authorized consumer needs to create measurement job for collecting the performance data of NSI(s). | |
| Step 1 (M) | The authorized consumer requests the NSI measurement job control service producer to create an nsI measurement job to collect the performance data of NSI(s). The request needs to indicate that the performance data needs to be reported by performance data file or by performance data streaming. | |
| Step 2 (M) | The NSI measurement job control service producer checks if the requested NSI measurement job can be supported by the existing NSI measurement job(s). If the result is true, the NSI measurement job control service producer responds to the request and indicates that the requested NSI measurement job is supported by the existing NSI measurement job(s); Else, the NSI measurement job control service producer decomposes the performance data type of NSI(s) into performance data type(s) of the constituent NSSI(s) and/or of constituent 3GPP NF(s); and The NSI measurement job control service producer consumes the NSSI measurement job control service to create the measurement job(s) for the constituent NSSI(s) (according to the use case "Creation of measurement job for NSSI(s)" as described in clause 5.1.2.1.1), or The NSI measurement job control service producer consumes the NF measurement job control service to create the measurement job(s) for the constituent 3GPP NF(s) (according to the use case "Creation of measurement job for 3GPP NF" as described in clause 5.1.1.1.1). | Creation of measurement job for NSSI; and/or Creation of measurement job for 3GPP NF |
| Ends when | All the steps identified above are successfully completed. | |
| Exceptions | One of the steps identified above fails. | |

5.1.4.1.1 Creation of measurement job for 3GPP network(s)

| Use case stage | Evolution/Specification | <<Uses>> Related use |
|---|---|---|
| Goal | To enable the authorized consumer to create a measurement job for collecting the network performance data that are not specific to network slicing. | |
| Actors and Roles | An authorized consumer of Network measurement job control service. | |
| Telecom resources | 3GPP network(s); Network measurement job control service producer; NF measurement job control service producer; NF performance data file reporting service producer and/or NF performance data streaming service producer. | |
| Assumptions | N/A | |
| Pre-conditions | The 3GPP network(s) have been deployed; The network measurement job control service producer is in operation. | |
| Begins when | The authorized consumer needs to create a network measurement job for collecting the network performance data that are not specific to network slicing. | |
| Step 1 (M) | The authorized consumer requests the network measurement job control service producer to create measurement job to collect the network performance data that are not specific to network slicing. The request needs to indicate that the performance data needs to be reported by performance data file or by performance data streaming. | |

-continued

| Use case stage | Evolution/Specification | <<Uses>> Related use |
|---|---|---|
| Step 2 (M) | Tire network measurement job control service producer checks if the requested network measurement job can be supported by the existing network measurement job(s). If the result is true, the network measurement job control service producer responds to the request and indicates that the requested network measurement job is supported by the existing network measurement job(s); Else, the network measurement job control service producer decomposes the performance data type of 3GPP network(s) into performance data type(s) of the constituent 3GPP NF(s), and consumes the NF measurement job control service to request creation of the measurement job(s) for the constituent 3GPP NF(s) (according to the use case "Creation of measurement job for 3GPP NF" as described in clause 5.1.1.1.1). | Creation of measurement job for 3GPP NF |
| Ends when | All the steps identified above are successfully completed. | |
| Exceptions | One of the steps identified above fails. | |
| Post-conditions | The measurement job for 3GPP network(s) has been created, and the netw ork measurement job control service producer consumes the NF performance data file reporting service and/or NF performance data streaming service to get the performance data of the constituent NF(s), and generates the performance data for the network measurement job; or Tire requested network measurement job is not created but supported by the existing network measurement job(s), according to step 2. | 3GPP NF performance data file reporting; 3GPP NF performance data streaming |
| Traceability | REQ-MJCS_NW-FUN-1, REQ-MJCS_NW-FUN-2, REQ-MJCS_NW-FUN-3, and REQ-MJCS_NW-FUN-4 | |

After performance measurement job creation, the performance measurements are reported to monitor the performance of 3GPP NF, NSSI, NSI and non-slice-specific network by performance data file reporting and performance data streaming services. For performance data file reporting, a service producer may send a notification to a consumer to indicate a measurement data file is ready. The consumer can in response send a request to fetch the performance data file. For performance data streaming, once the performance data are ready, a producer may send the performance data by streaming manner to the consumer. The performance data collection and reporting interval of the performance data streaming are the same, and may be configurable.

The following use cases describe the functions of performance measurement job termination for NF, NSI. NSSI and networks. The performance measurement job creation of the different use cases add that upon receiving the request, the service producer first checks whether the performance measurement job is currently serving other consumers, and if so, the service producer sends a response indicating that the performance measurement job is currently serving other consumers and cannot be terminated; otherwise, the performance measurement job is terminated. Similar changes may be added in the post condition to indicate that the requested performance measurement job may or may not be terminated.

5.1.1.1.x Termination of Measurement Job for 3GPP NF(s)

| Use case stage | Evolution/Specification | <<Uses>> Related use |
|---|---|---|
| Goal | To enable the authorized consumer to request the NF measurement job control service producer to terminate a NF measurement job. | |
| Actors and Roles | An authorized consumer of NF measurement job control service. | |
| Telecom resources | 3GPP NF(s) NF measurement job control service producer. | |
| Assumptions | N/A | |
| Pre-conditions | The NF measurement job has been created. | |
| Begins when | The authorized consumer does not need the NF measurement job that is collecting the performance data of 3GPP NF(s). | |
| Step 1 (M) | The authorized consumer requests the NF measurement job control service producer to terminate a measurement job that is collecting the performance data of 3GPP NF(s). | |
| Step 2 (M) | The NF measurement job control service producer checks if the NF measurement job is currently serving other consumers. If the result is true, the NF measurement job control service producer does not terminate the NF measurement job, but responds to the request and indicates that NF measurement job is serving other consumers; Else, the NF measurement job control service producer requests the NF(s) to terminate the measurement job, and acknowledges to the subject consumer about successful termination of the NF measurement job. | |

| Use case stage | Evolution/Specification | <<Uses>> Related use |
|---|---|---|
| Ends when | All the steps identified above are successfully completed. | |
| Exceptions | One of the steps identified above fails. | |
| Post-conditions | The NF measurement job is terminated, or still retained to serve other consumers according to step 2. | |
| Traceability | REQ-MJCS_NF-FUN-x and REQ-MJCS_NF-FUN-y | |

5.1.2.1.x Termination of Measurement Job for NSSI(s)

| Use case stage | Evolution/Specification | <<Uses>> Related use |
|---|---|---|
| Goal | To enable the authorized consumer to request the NSSI measurement job control service producer to terminate an NSSI measurement job. | |
| Actors and Roles | An authorized consumer of NSSI measurement job control service. | |
| Telecom resources | NSSI(s) NSSI measurement job control service producer. NF measurement job control service producer | |
| Assumptions | N/A | |
| Pre-conditions | The NSSI measurement job has been created. | |
| Begins when | The authorized consumer does not need the NSSI measurement job. | |
| Step 1 (M) | The authorized consumer requests the NSSI measurement job control service producer to terminate a measurement job that is collecting the performance data of NSSI(s). | |
| Step 2 (M) | The NSSI measurement job control service producer checks if the NSSI measurement job is currently serving other consumers. If the result is true, the NSSI measurement job control service producer does not terminate the NSSI measurement job, but responds to the request and indicates that NSSI measurement job is serving other consumers; Else, the NSSI measurement job control service producer terminates the NSSI measurement job, and acknowledges to the subject consumer about termination; and The NSSI measurement job control service producer requests the corresponding NSSI measurement job control service producer(s) to terminate the the measurement job(s) of the constituent NSSI(s) if any, and The NSSI measurement job control service producer consumes the NF measurement job control service to request termination of the measurement job(s) of the constituent 3GPP NF(s) if any (according to the use case "Termination of measurement job for 3GPP NF(s)" as described in clause 5.1.1.1.x). | Termination of measurement job for 3GPP NF(s) |
| Ends when | All the steps identified above are successfully completed. | |
| Exceptions | One of the steps identified above fails. | |
| Post-conditions | The NSSI measurement job is terminated, or still retained to serve other consumers according to step 2. | |
| Traceability | REQ-MJCS_NSSI-FUN-x and REQ-MJCS_NSSI-FUN-y | |

5.1.3.1.x Termination of Measurement Job for NSI(s)

| Use case stage | Evolution/Specification | <<Uses>> Related use |
|---|---|---|
| Goal | To enable the authorized consumer to request the NSI measurement job control service producer to terminate an nsI measurement job. | |
| Actors and Roles | An authorized consumer of NSI measurement job control service. | |
| Telecom resources | NSI(s); NSI measurement job control service producer; NSSI measurement job control service producer; NF measurement job control service producer. | |
| Assumptions | N/A | |
| Pre-conditions | The NSI measurement job has been created. | |
| Begins when | The authorized consumer does not need the NSI measurement job. | |
| Step 1 (M) | The authorized consumer requests the NSI measurement job control service producer to terminate an nsI measurement job that is collecting the performance data of NSI(s). | |
| Step 2 (M) | The NSI measurement job control service producer checks if the NSI measurement job is currently serving other consumers. If the result is true, the NSI measurement job control service producer does not terminate the NSI measurement job, but responds | Termination of measurement job for |

-continued

| Use case stage | Evolution/Specification | <<Uses>> Related use |
|---|---|---|
| | to the request and indicates that NSI measurement job is serving other consumers; Else, the NSI measurement job control service producer terminates the NSI measurement job, and acknowledges to the subject consumer about termination; and The NSI measurement job control service producer consumes the NSSI measurement job control service to request termination of the measurement job(s) of the constituent NSSI(s) if any (according to the use case "Termination of measurement job for NSSI(s)" as described in clause 5.1.2.1.x), and The NSI measurement job control service producer consumes the NF measurement job control service to request termination of the measurement job(s) of the constituent 3GPP NF(s) if any (according to the use case "Termination of measurement job for 3GPP NF(s)" as described in clause 5.1.1.1.x). | NSSI(s); Termination of measurement job for 3GPP NF(s) |
| Ends when | All the steps identified above are successfully completed. | |
| Exceptions | One of the steps identified above fails. | |
| Post-conditions | The NSI measurement job is terminated, or still retained to serve other consumers according to step 2. | |
| Traceability | REQ-MJCS_NSI-FUN-x and REQ-MJCS_NSI-FUN-y | |

5.1.4.1.x Termination of Measurement Job for 3GPP Network(s)

| Use case stage | Evolution/Specification | <<Uses>> Related use |
|---|---|---|
| Goal | To enable the authorized consumer to request the network measurement job control service producer to terminate a network measurement job. | |
| Actors and Roles | An authorized consumer of network measurement job control service. | |
| Telecom resources | NSSI(s); Network measurement job control service producer; NF measurement job control service producer. | |
| Assumptions | N/A | |
| Pre-conditions | The network measurement job has been created. | |
| Begins when | The authorized consumer does not need the network measurement job. | |
| Step 1 (M) | The authorized consumer requests the network measurement job control service producer to terminate a network measurement job that is collecting the performance data of network(s). | |
| Step 2 (M) | The network measurement job control service producer checks if the network measurement job is currently serving other consumers. If the result is true, the network measurement job control service producer does not terminate the network measurement job, but responds to the request and indicates that network measurement job is serving other consumers; Else, the network measurement job control service producer terminates the network measurement job, and acknowledges to the subject consumer about termination, and consumes the NF measurement job control service to request termination of the measurement job(s) of the constituent 3GPP NF(s) (according to the use case "Termination of measurement job for 3GPP NF(s)" as described in clause 5.1.1.1.x). | Termination of measurement job for 3GPP NF(s) |
| Ends when | All the steps identified above are successfully completed. | |
| Exceptions | One of the steps identified above fails. | |
| Post-conditions | The network measurement job is terminated, or still retained to serve other consumers according to step 2. | |
| Traceability | REQ-MJCS_NW-FUN-x and REQ-MJCS_NW-FUN-y | |

REQ-MJCS_NF-FUN-3

The NF measurement job control service producer shall have the capability to create a measurement job at 3GPP NF(s).

REQ-MJCS_NSSI-FUN-4

The NSSI measurement job control service producer shall have the capability to create a measurement job for NSSI(s).

REQ-MJCS_NSI-FUN-4

The NSSI measurement job control service producer shall have the capability to create a measurement job for NSI(s).

REQ-MJCS_NW-FUN-4

The network measurement job control service producer shall have the capability to create a measurement job for 3GPP network(s).

REQ-MJCS_NF-FUN-x

The NF measurement job control service producer shall have the capability to terminate a measurement job at 3GPP NF(s).

REQ-MJCS_NF-FUN-y

The NF measurement job control service producer shall have the capability to allow its authorized consumer to request termination of a NF measurement job.

Req-Mjcs_Nssi-Fun-x

The NSSI measurement job control service producer shall have the capability to terminate an NSSI measurement job.

REQ-MJCS_NSSI-FUN-y

The NSSI measurement job control service producer shall have the capability to allow its authorized consumer to request termination of an NSSI measurement job.

REQ-MJCS_NSI-FUN-x

The NSI measurement job control service producer shall have the capability to terminate an nsI measurement job.

REQ-MJCS_NSI-FUN-y

The NSI measurement job control service producer shall have the capability to allow its authorized consumer to request termination of an nsI measurement job.

REQ-MJCS_NW-FUN-x

The network measurement job control service producer shall have the capability to terminate an nsI measurement job.

REQ-MJCS_NW-FUN-y

The network measurement job control service producer shall have the capability to allow its authorized consumer to request termination of a network measurement job.

In various embodiments, the measurement job control service producer may be configured to receive, from an authorized consumer, a request to consume a measurement job control service, analyze the request, take appropriate action to satisfy the request and respond to the authorized consumer about the result of the request. The request may be to create a measurement job to collect the performance data for a NF, NSSI, NSI, or network.

To create a measurement job for the NF, the NF measurement job control service producer may be configured to check if the requested measurement job can be supported by an existing NF measurement job(s) and create the NF measurement job(s) if no measurement job exists to support the requested measurement job, and respond to the consumer that the requested job can be supported by existing job(s) if the job(s) exist.

To create a measurement job for NSSI, the NSSI measurement job control service producer may be configured to check if the requested measurement job can be supported by an existing NSSI measurement job(s), and if the measurement job exists, respond to the consumer that the requested job can be supported by the existing job(s). If no measurement job exists to support the requested measurement job, the NSSI measurement job control service producer may be configured to decompose the NSSI performance data types into the data type of constituent NSSI(s) and/or 3GPP NF, request the NSSI measurement job control service producer to create measurement job(s) for the constituent NSSI(s), consume the NF measurement job control service producer to create NF measurement job(s) and respond to the consumer that the requested job(s) have been created.

To create a measurement job for NSI, the NSI measurement job control service producer may be configured to check if the requested measurement job can be supported by an existing NSI measurement job(s) and if the measurement job exists, respond to the consumer that the requested job can be supported by the existing job(s). If no measurement job exists to support the requested measurement job, the NSI measurement job control service producer may be configured to decompose the NSI performance data types into the data type of constituent NSSI(s) and/or 3GPP NF, consume the NSSI measurement job control service producer to create measurement job(s) for the constituent NSSI(s), consume the NF measurement job control service producer to create NF measurement job(s); and respond to the consumer that the requested job(s) have been created.

To create a measurement job for a network, the network measurement job control service producer may be configured to check if the requested measurement job can be supported by an existing network measurement job(s), and if the measurement job exists, respond to the consumer that the requested job can be supported by the existing job(s). If no measurement job exists to support the requested measurement job, the network measurement job control service producer may be configured to: decompose the network performance data types into the data type of 3GPP NF(s), consume the NF measurement job control service producer to create an NF measurement job(s) and respond to the consumer that the requested job(s) have been created.

On the other hand, the request may be to terminate a measurement job to stop collecting the performance data for a NF, NSSI, NSI, or network. To terminate a measurement job for a NF, the NF measurement job control service producer may be configured to: check if the requested measurement job is serving other consumers, terminate the NF measurement job(s) if other consumers are not being serviced, and respond to the consumer that the requested job is currently serving other consumers.

To terminate a measurement job for a NSSI, the NSSI measurement job control service producer may be configured to: check if the requested measurement job is serving other consumers and respond to the consumer that the requested job is currently serving other consumers. If the measurement job is not serving other consumers, then the NSSI measurement job control service producer may be configured to: decompose the NSSI performance data types into the data type of the constituent NSSI(s) and/or 3GPP NF, request the NSSI measurement job control service producer to terminate the measurement job(s) for the constituent NSSI(s), consume the NF measurement job control service producer to terminate NF measurement job(s) and respond to the consumer that the requested job(s) have been terminated.

To terminate a measurement job for an NSI, the NSI measurement job control service producer may be configured to: check if the requested measurement job is serving other consumers and respond to the consumer that the requested job is currently serving other consumers. If the measurement job is not serving other consumers, then the NSI measurement job control service producer may be configured to: decompose the NSI performance data types into the data type of the constituent NSSI(s) and/or 3GPP NF, consume the NSSI measurement job control service producer to terminate the measurement job(s) for the constituent NSSI(s) consume the NF measurement job control service producer to terminate the NF measurement job(s) and respond to the consumer that the requested job(s) have been terminated.

To terminate a measurement job for a network, the network measurement job control service producer may be configured to: check if the requested measurement job is serving other consumers and respond to the consumer that the requested job is currently serving other consumers. If the measurement job is not serving other consumers, then the network measurement job control service producer may be configured to: decompose the network performance data types into the data type of the 3GPP NF(s), consume the NF measurement job control service producer to terminate the NF measurement job(s) and respond to the consumer that the requested job(s) have been terminated.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus of a network function (NF) performance measurement job control service producer, the apparatus comprising:
   processing circuitry arranged to:
      receive, from an entity, an NF performance measurement job request to terminate an NF performance measurement job that is collecting performance data of an NF from a fifth generation (5G) network including network slicing;
      determine, in response to reception of the NF performance measurement job request, whether the NF performance measurement job is serving another entity;
      in response to a determination that the NF performance measurement job is serving another entity, generate a response that the NF performance measurement job request will not be fulfilled, the response comprising an indication that the NF performance measurement job is serving at least one other entity, and
      in response to a determination that the NF performance measurement job is not serving another entity, fulfill the NF performance measurement job request; and
   a memory arranged to store the performance measurement job request.

2. The apparatus of claim 1, wherein, in response to a determination that the NF performance measurement job is not serving the other entity, the processing circuitry is arranged to:
   generate, for transmission to the NF, a measurement job termination request, and
   generate, for transmission to the entity, an acknowledgment of successful termination of the NF performance measurement job.

3. An apparatus of a Network Slice Subnet Instance (NSSI) performance measurement job control service producer, the apparatus comprising:
   processing circuitry arranged to:
      receive, from an entity, a first performance measurement job request to create a new NSSI performance measurement job to collect performance data of an NSSI from a fifth generation (5G) network including network slicing; and
      determine, in response to reception of the first performance measurement job request:
         whether an existing NSSI performance measurement job to collect the performance data of the NSSI is able to support the new NSSI performance measurement job;
         in response to a determination that the existing NSSI performance measurement job is able to support the new NSSI performance measurement job, generate a response with an indication that the new NSSI performance measurement job is supported by the existing NSSI performance measurement job, and
         in response to a determination that the existing NSSI performance measurement job is unable to support the new NSSI performance measurement job, fulfill the first performance measurement job request; and
   a memory arranged to store the performance measurement job request.

4. The apparatus of claim 3, wherein:
   in response to a determination that the existing NSSI performance measurement job is unable to support the new NSSI performance measurement job, the processing circuitry is arranged to:
      decompose a performance data type of the NSSI into a performance data type of at least one of a constituent NSSI or a constituent NF, and at least one of:
         generate the first measurement job request for transmission to a corresponding NSSI measurement job control service producer to create the NSSI measurement job for the constituent NSSI to collect performance data of the constituent NSSI, or
         generate the NF measurement job request for transmission to a corresponding NF measurement job control service producer to create an NF measurement job to collect performance data of the constituent NF.

5. The apparatus of claim 3, wherein the processing circuitry is further arranged to:
   receive, from the entity, a second performance measurement job request to terminate the existing NSSI performance measurement job;
   determine, in response to reception of the second performance measurement job request:
      whether the existing NSSI performance measurement job is serving another entity;
      in response to a determination that the existing NSSI performance measurement job is serving another entity, generate a response that the second performance measurement job request will not be fulfilled, the response comprising an indication that the existing NSSI measurement job is serving at least one other entity, and in response to a determination that the existing NSSI performance measurement job is not serving another entity, fulfill the second performance measurement job request.

6. The apparatus of claim 5, wherein:

in response to the determination that the existing NSSI performance measurement job is not serving the other entity, the processing circuitry is arranged to:

terminate the existing NSSI performance measurement job; and generate, for transmission to the entity, an acknowledgment of successful termination of the existing NSSI performance measurement job, and termination of the existing NSSI performance measurement job comprises at least one of:

generation, for transmission to a corresponding NSSI measurement job control service producer, of a request for the corresponding NSSI measurement job control service producer to terminate an NSSI measurement job of a constituent NSSI, or generation, for transmission to a corresponding NF measurement job control service producer, of a request for the corresponding NF measurement job control service producer to terminate an NF measurement job of a constituent NF.

7. An apparatus of a Network Slice Instance (NSI) performance measurement job control service producer, the apparatus comprising:

processing circuitry arranged to:

receive, from an entity, a first performance measurement job request to create a new NSI performance measurement job to collect performance data of an NSI from a fifth generation (5G) network including network slicing; and determine, in response to reception of the first performance measurement job request:

whether an existing NSI performance measurement job to collect the performance data of the NSI is able to support the new NSI performance measurement job;

in response to a determination that the existing NSI performance measurement job is able to support the new NSI performance measurement job, generate a response with an indication that the new NSI performance measurement job is supported by the existing NSI performance measurement job, and in response to a determination that the existing NSI performance measurement job is unable to support the new NSI performance measurement job, fulfill the first performance measurement job request; and a memory arranged to store the performance measurement job request.

8. The apparatus of claim 7, wherein:

in response to a determination that the existing NSI performance measurement job is unable to support the new NSI measurement job, the processing circuitry is arranged to:

decompose a performance data type of the NSI into a performance data type of at least one of a constituent Network Slice Subnet Instance (NSSI) or a constituent network function (NF), and at least one of:

generate an NSSI measurement job request for transmission to a corresponding NSSI measurement job control service producer to create an NSSI measurement job for the constituent NSSI to collect performance data of the constituent NSSI, or generate the NF measurement job request for transmission to a corresponding NF measurement job control service producer to create an NF measurement job to collect performance data of the constituent NF.

9. The apparatus of claim 7, wherein the processing circuitry is further arranged to:

receive, from the entity, a second performance measurement job request to terminate the existing NSI performance measurement job;

determine, in response to reception of the second performance measurement job request:

whether the existing NSI performance measurement job is serving another entity;

in response to a determination that the existing NSI performance measurement job is serving another entity, generate a response that the second performance measurement job request will not be fulfilled, the response comprising an indication that the existing NSI measurement job is serving at least one other entity, and in response to a determination that the existing NSI performance measurement job is not serving another entity, fulfill the second performance measurement job request.

10. The apparatus of claim 9, wherein:

in response to the determination that the existing NSI performance measurement job is not serving the other entity, the processing circuitry is arranged to:

terminate the existing NSI performance measurement job; and generate, for transmission to the entity, an acknowledgment of successful termination of the existing NSI performance measurement job, and termination of the existing NSI performance measurement job comprises at least one of:

generation, for transmission to a corresponding Network Slice Subnet Instance (NSSI) measurement job control service producer, of a termination request for the corresponding NSSI measurement job control service producer to terminate an NSSI measurement job of a constituent NSSI, or generation, for transmission to a corresponding network function (NF) measurement job control service producer, of a request for the corresponding NF measurement job control service producer to terminate an NF measurement job of a constituent NF.

* * * * *